United States Patent [19]
Kalopissis et al.

[11] 3,884,625
[45] May 20, 1975

[54] INDOPHENOLS DYES FOR COLORING KERATIN FIBERS

[75] Inventors: Gregoire Kalopissis, Paris; Andree Bugaut, Boulogne-sur-Seine; Francoise Estradier, Paris, all of France

[73] Assignee: L'Oreal, Paris, France

[22] Filed: Feb. 28, 1973

[21] Appl. No.: 336,531

Related U.S. Application Data

[63] Continuation-in-part of Ser. No. 100,433, Dec. 21, 1970, abandoned, which is a continuation-in-part of Ser. No. 49,905, June 25, 1970, abandoned.

[30] Foreign Application Priority Data
June 25, 1969 Luxemborg .................... 58,954

[52] U.S. Cl. ........................... 8/10; 8/10.1; 8/10.2; 8/11; 260/396 N
[51] Int. Cl.² ......................................... D06P 3/04
[58] Field of Search ............ 260/396 N; 8/10.2, 11, 8/10.1

[56] References Cited
UNITED STATES PATENTS
1,102,028  6/1914  Fischer ........................... 96/100 X
3,516,778  6/1970  Brunner ............................. 8/10.2

*Primary Examiner*—Jerome D. Goldberg
*Assistant Examiner*—Vera C. Clarke
*Attorney, Agent, or Firm*—Cushman, Darby & Cushman

[57] ABSTRACT

A composition for coloring keratin fibers comprises a solution of an indophenol in a solvent selected from the group consisting of water and an aqueous solution of a lower alkanol, said indophenol having the formula

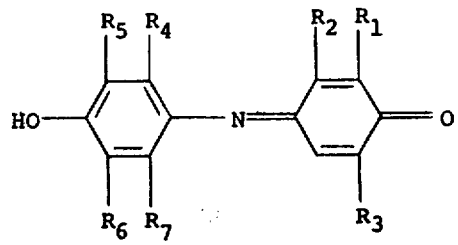

wherein $R_1$ and $R_3$ each independently represent a member selected from the group consisting of hydrogen, halogen, lower alkyl and —NHCOR wherein R is lower alkyl; $R_2$ represents a member selected from the group consisting of ureido, —NHCOR wherein R is lower alkyl and —NHR$_8$ wherein $R_8$ represents a member selected from the group consisting of hydrogen, lower alkyl and carbamylmethyl, with the proviso that when $R_2$ is —NHR$_8$, $R_3$ is not hydrogen; and $R_4$, $R_5$, $R_6$ and $R_7$ each independently represent a member selected from the group consisting of hydrogen, halogen, lower alkyl and lower alkoxy. The said indophenol is present in the composition in amounts ranging from 0.01 to 0.5 weight percent thereof.

9 Claims, No Drawings

INDOPHENOLS DYES FOR COLORING KERATIN FIBERS

This application is a continuation-in-part of our application Ser. No. 100,433, filed Dec. 21, 1970, now abandoned, which in turn is a continuation-in-part of our application Ser. No. 49,905, filed June 25, 1970, now abandoned.

The present invention relates to novel indophenols, to novel processes for producing the same and to a novel cosmetic composition containing said indophenols for dyeing keratinic fiber such as human hair. More specifically, the present invention relates to novel indophenols and to a method for preparing and using said indophenols, which have the formula

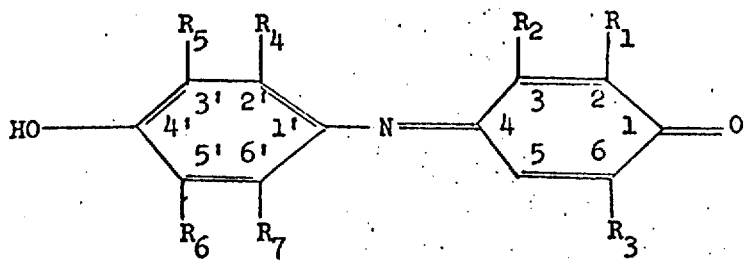

wherein:

$R_1$ and $R_3$, each independently, represent a hydrogen, a halogen, lower alkoxy, lower alkyl, a ureido residue or —NHCOR, wherein R represents lower alkyl;

$R_2$ represents an ureido residue, —NHCOR wherein R represents lower alkyl, or —NHR$_8$ wherein $R_8$ represents hydrogen, lower alkyl, a hydroxy lower alkyl or carbamylmethyl, with the proviso that when $R_2$ is —NHR$_8$, $R_3$ is not hydrogen;

$R_4$, $R_5$, $R_6$ and $R_7$ each independently represent hydrogen, halogen, lower alkoxy or lower alkyl, it being understood that the terms lower alkyl and lower alkoxy means such radicals containing from 1 to 4 carbon atoms and that the above formula does not exclude the other tautomeric forms of these compounds.

Indophenols of this invention can be prepared by three different methods, one of which is novel. The first method involves condensing in a known manner a paraamino-phenol of the formula:

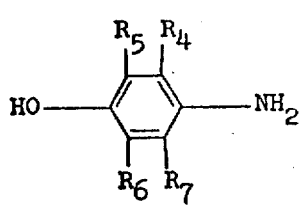

on a phenolic compound of the formula

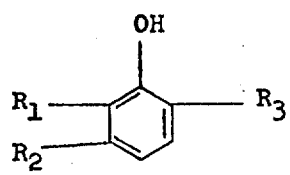

wherein the radicals $R_1$ to $R_7$ have the meanings given above. This condensation reaction is performed in an aqueous medium at a pH of about 8 to 12, preferably, about 10.5 to 11, at a temperature between 0° and 40°C. and in the presence of an oxidizing agent such as air, hydrogen peroxide, potassium or ammonium persulfate, sodium hypochlorite or potassium ferricyanide.

Representative phenols used to prepare the indophenols include 5-amino-2-methyl phenol, 5-amino-2-chloro phenol, 3-acetylamino phenol, 2-methyl-5-methylamino phenol, 5-carbamylmethylamino-2-methyl phenol, 3-amino-2,6-dimethyl phenol, 3-acetylamino-2,6-dimethyl phenol and 5-acetylamino-2-methyl phenol.

Representative paraminophenols used to prepare the indophenols include, for example, paraaminophenol, 4-amino-2-methtyl phenol, 4-amino-2,6-dimethyl phenol, 4-amino-2-chloro phenol, 4-amino-5-methoxy-2-methyl phenol and 4-amino-3-methyl phenol.

The mole ratio of phenol to paraaminophenol ranges between about 0.5:1 to 2:1 and is preferably 1:1. The amount of oxidizing agent can vary between about 1 to 5 times the stoichiometric quantity for oxidizing the paraaminophenol to the corresponding quinone-imine. This amount is preferably 1 mole of persulfate or 2 moles of ferricyanide for 1 mole of paraaminophenol.

A second method of preparing indophenols defined above which are useful in the cosmetic composition of this invention involves the condensation of a chlorinated quinone-imine of the formula:

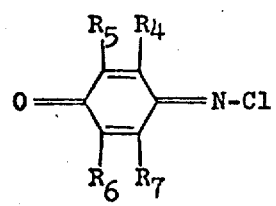

wherein $R_4$, $R_5$, $R_6$ and $R_7$ have the meaning given above, on a phenol, also as defined above, the condensation reaction being performed in an alkaline medium at a pH of about 10 to 12 and at a temperature of about 10° to 40°C. The mole ratio of chlorinated quinone-imine to phenol is preferably 1:1.

The third and novel process for preparing said indophenols in accordance with the present invention, comprises oxidizing in a first stage a paraaminophenol as defined above to produce a quinone-imine of the formula

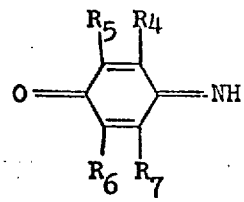

wherein $R_4$-$R_7$ have the meanings indicated above, and thereafter, in a second stage, condensing the resulting quinone-imine on a phenolic compound, also as defined above. The mole ratio of the quinone-imine to said phenol is preferably 1:1.

Oxidation of the starting paraaminophenol into quinone-imine is performed by heating the paraaminophenol at a temperature ranging between 30° and 70°C. in an anhydrous solvent such as ethyl ether or isopropyl ether and in the presence of an oxidizing agent, which can be, for example, silver oxide or lead oxide. Generally, the oxidizing agent is present in amounts corresponding to 1 to 2 times the stoichiometric quantity for oxidizing the paraamino phenol and preferably 1.5 times this stoichiometric quantity.

The resulting quinone-imine obtained in said reaction is isolated from the reaction mass by any convenient separation technique such as by filtration. Thereafter the filtrate containing the quinone-imine is evaporated to dryness and purified by recrystallization in an anhydrous solvent before being condensed on said phenolic compound. The condensation reaction is performed at a temperature ranging from about 5° to 30°C. either in an aqueous medium or in an inert solvent such as ether or benzene, and preferably in an aqueous ammoniacal medium.

The indophenols prepared in accordance with the novel processes of this invention are ideally suited for use in dyeing of keratinous fibers, particularly human hair.

Thus, the present invention also provides a novel dye composition for coloring keratinous fibers, particularly human hair, which comprises at least one indophenol as described above in a solvent selected from the group consisting of water and an aqueous solution of lower alkanol, said indophenol being present in amounts ranging from about 0.1 to 0.5 weight percent, preferably about 0.05 to 0.3 weight percent of the total dye composition, said composition having a pH ranging from about 5–11, preferably about 7–11.

The dye composition of this invention, when it contains said indophenol as the sole dyeing agent as defined above, imparts to the keratin fiber interesting shades in the range of orange pinks.

However, the dye composition of this invention can also include one or more conventional hair dyes, for example, aniline dyes or, anthraquinone dyes. Indoaniline dyes or indamine dyes can also be used.

Additionally, the dye composition of this invention can include conventional thickeners and can be in the form of creams or gels and can also contain other usual cosmetic adjuvants such as wetting agents, dispersing agents, swelling agents, penetrating agents, emollients or perfumes. Additionally, the dye composition of this invention can be provided in the form of a sprayable aerosol, packaged in conventional aerosol containers.

Keratin fibers, in particular human hair, can be dyed with the dye composition of this invention in any conventional manner and usually by applying said composition on the fibers to be dyed and permitting the dye composition to remain in contact with the fibers about 5 to 30 minutes. Thereafter, the treated fibers are rinsed and if desired even washed before drying the same.

As another embodiment of a cosmetic composition of the present invention, there is provided a capillary hair-setting lotion comprising an indophenol as defined above dissolved in an aqueous lower alkanol solution, together with a conventional water- or lower alkanol-soluble cosmetic resin. These conventional resins include polyvinyl pyrrolidone, copolymers of polyvinylpyrrolidone and vinyl acetate, copolymers of vinyl acetate and an unsaturated carboxylic acid such as crotonic acid, copolymers resulting from the copolymerization of vinyl acetate, crotonic acid and an acrylic or methylacrylic ester, copolymers resulting from the copolymerization of vinyl acetate and a vinyl alkyl ether, copolymers resulting from the copolymerization of vinyl acetate, crotonic acid and a vinyl ester of a long carbon chain acid or an allyl or methallyl ester of a long carbon chain acid, copolymers resulting from the copolymerization of an ester formed from an unsaturated alcohol and a short carbon chain acid, an unsaturated short carbon chain acid and at least one ester formed from a saturated alcohol and an unsaturated short carbon chain acid, and copolymers resulting from the copolymerization of at least one unsaturated ester and at least one unsaturated acid. Representative of such resins are polyvinylpyrrolidone having a molecular weight ranging from about 10,000 to 700,000, copolymers of vinylpyrrolidone-vinyl acetate, wherein the ratio of VP to VA ranges between 30:70–70:30, copolymers of maleic anhydride-butylvinyl ether, copolymers of vinyl acetate and allyl stearate and allyloxy acetic acid, copolymers of methyl methacrylate and stearyl methacrylate and dimethyl methacrylate and the like, said resins being used in the proportion of 1 to 3% by weight of the total composition. Generally, the indophenol is present in said hair setting lotion in amounts ranging from about 0.01 to 0.3 weight % of the total composition.

The alcohols suitable for making the hair-setting lotions according to the invention are low molecular weight alcohols, preferably, ethanol or isopropanol. These alcohols are used in amounts of about 20 to 50% by weight of the total composition.

The hair-setting lotion according to the invention is employed in a conventional manner by applying the same to previously washed and rinsed wet hair, followed by rolling the treated hair on curlers and thereafter drying the hair.

The following examples are given to illustrate the present invention. The temperatures indicated in these examples are expressed in degrees Celsius (centigrade) and unless otherwise specifically stated, all parts and percentages are by weight.

EXAMPLE 1

N-[(4-hydroxy)phenyl]-3-amino-6-methyl benzoquinone-imine is prepared in accordance with the following reaction:

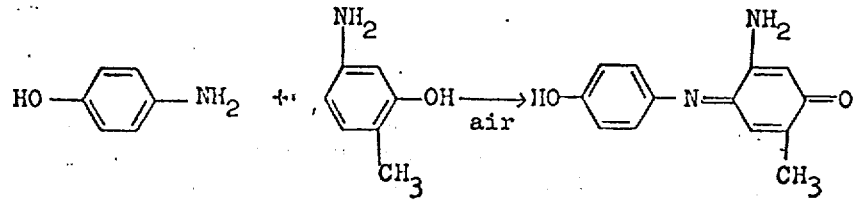

Thus, 0.01 mole (1.09 g) of paraaminophenol is dissolved in 100 cm³ of a 0.1 N NaOH solution. A second solution of 0.01 mole (1.23 g) of 3-amino-6-methyl phenol in 100 cm³ of a 0.1 N NaOH solution is also prepared. The two solutions are then mixed and air is bubbled in the resulting mixture for about 5 hours at ambient temperature. The reaction mixture is then acidified with sufficient HCl to pH 5 to produce 1.2 g of said indophenol which is then filtered off and which, after recrystallization from a dimethylformamide-water mixture, melts at 215°.

| Analysis | Calculated for $C_{13}H_{12}N_2O_2$ | Found | |
|---|---|---|---|
| C % | 68.41 | 68.14 | 67.93 |
| H % | 5.26 | 5.25 | 5.26 |
| N % | 12.28 | 12.32 | |

EXAMPLE 2

N-[(4'-hydroxy)phenyl]-3-amino-6-methyl benzoquinone-imine is prepared in accordance with the following reaction:

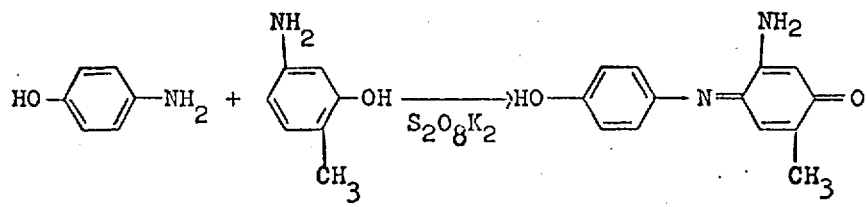

A first solution is prepared by dissolving 0.04 mole (4.36 g) of paraaminophenol in 200 cm³ N NaOH solution. The two solutions are mixed and there is then slowly added, with stirring, 0.04 mole (10.81 g) of potassium persulfate in solution in 500 cm³ of water at a temperature of about 25°C. When the addition is completed, 4.3 g of the above resulting indophenol is filtered off and dried. The thus produced indophenol is practically pure and melts at 220°. Molecular mass calculated for $C_{13}H_{12}N_2O_2$: 228 Molecular mass found by potentiometric dosing: 232.

EXAMPLE 3

N-[(4'-hydroxy)phenyl]-3-amino-2,6-dimethyl benzoquinoneimine is prepared in accordance with the following reaction:

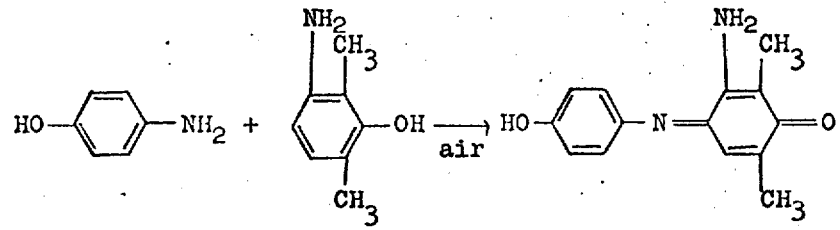

A first solution is prepared by dissolving 0.02 mole (2.18 g) of paraaminophenol in 200 cm³ of a 0.1 N NaOH solution. A second solution is prepared by dissolving 0.01 mole (1.37 g) of 2,6-dimethyl-3-amino phenol also in 100 cm³ of 0.1 N NaOH solution. The two solutions are mixed and air is bubbled for 2 hours in the resulting mixture at ambient temperature. The pH of the reaction mass is then brought to 5 by addition of an aqueous hydrochloric acid solution. The reaction mass is then filtered off to produce 2.12 g of said indophenol which, after recrystallization in a dimethylformamide-water mixture, melts at 248°.

| Analysis | Calculated for $C_{14}H_{14}N_2O_2$ | Found | |
|---|---|---|---|
| C % | 69.42 | 69.38 | 68.78 |
| H % | 5.78 | 5.83 | 6.00 |
| N % | 11.57 | 11.70 | 11.67 |

EXAMPLE 4

N-[(4'-hydroxy)phenyl]-3-acetylamino-6-methyl benzoquinoneimine is prepared in accordance with the following reaction:

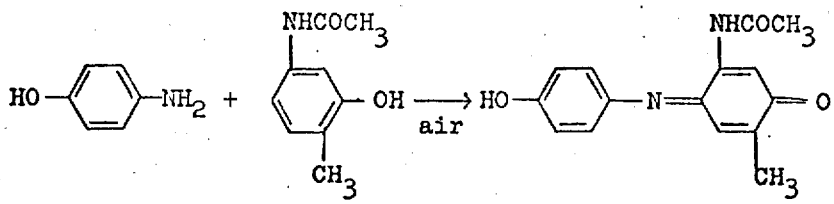

A first solution is prepared by dissolving 0.1 mole (16.5 g) of 2-methyl-5-acetylamino phenol in 500 cm³ of a frozen 0.2 N NaOH solution. A second solution is prepared by dissolving 0.1 mole (10.9 g) of paraaminophenol also in 500 cm³ of a frozen 0.2 N NaOH solution. The two solutions are mixed and, while the temperature is kept in the vicinity of 0°, air is bubbled for 5 hours through the resulting reaction mass. 20 g of said indophenol is recovered and is acidified with 20 cm³ of acetic acid and dried. After recrystallization in a dimethylformamide-water mixture, the purified indophenol melts at 254°.

| Analysis | Calculated for $C_{15}H_{14}N_2O_3$ | Found |
|---|---|---|
| C % | 66.66 | 66.62 |
| H % | 5.18 | 5.21 |
| N % | 10.37 | 10.40 |

EXAMPLE 5

N-[(3',5'-dimethyl-4'-hydroxy)phenyl]-3-acetylamino-6-methyl benzoquinone-imine is prepared according to the following reaction:

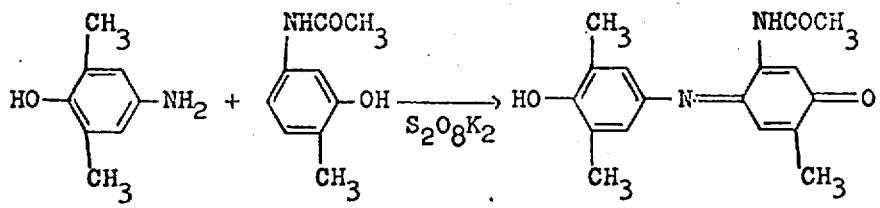

A first solution is prepared by dissolving 0.06 mole (13.08 g) of 2,6-dimethyl-4-amino phenol hydrobromide in 300 cm³ of a 0.2 N NaOH solution. A second solution is prepared by dissolving 0.06 mole (9.90 g) of 3-acetylamino-6-methyl phenol also in 300 cm³ of 0.2 N NaOH solution. The two solutions are mixed and then there is slowly added thereto, with stirring, 0.06 mole (16.2 g) of potassium persulfate in solution in 600 cm³ of water at ambient temperature. When the addition is completed, the reaction mixture is left for an hour at ambient temperature. The reaction mixture is then filtered off to produce said indophenol which, after recrystallization in a dimethyl-formamide-water mixture, melts at 260°.

EXAMPLE 6

N-[(4'-hydroxy-3'-methoxy)phenyl]-3-amino-2,6-dimethyl benzoquinone-imine is prepared according to the following reaction:

A solution is prepared by dissolving 0.015 mole (2.05 g) of 2,6-dimethyl-3-amino phenol in 75 cm³ of a 0.2 N NaOH solution. To this solution there is rapidly added initially a solution of 0.015 mole (3.42 g) of ammonium persulfate in 90 cm³ of water also containing 30 cm³ of ammonia at 22° Be. There is then added a solution of 0.015 mole (2.63 g) of 2-methoxy-4-amino phenol hydrochloride in 150 cm³ of water. When the addition is completed the above indophenol precipitates in the form of a brick-colored product which is filtered off, washed with water and dried under a vacuum. The resulting indophenol is chromatographically pure and melts between 126° and 128°.

Molecular mass calculated for $C_{15}H_{16}N_2O_3$: 272
Molecular mass found by potentiometric dosage in methylisobutylketone by perchloric acid: 276.

| Analysis | Calculated for $C_{15}H_{16}N_2O_3$ | Found | |
|---|---|---|---|
| C % | 66.17 | 65.35 | 66.71 |
| H % | 5.88 | 5.90 | 5.84 |
| N % | 10.29 | 10.19 | 10.44 |

EXAMPLE 7

N-[(4'-hydroxy-3'-methoxy)phenyl]-3-amino-6-methyl benzoquinone-imine is prepared in accordance with the following reaction:

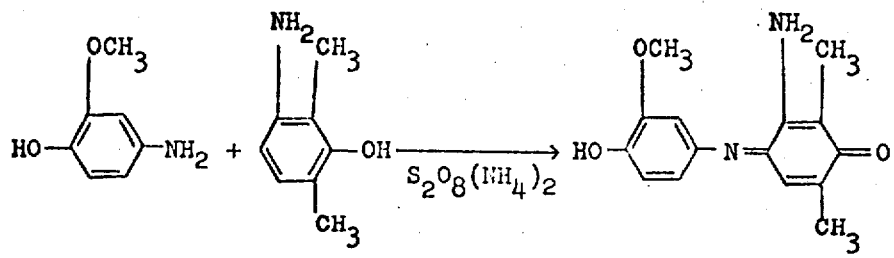

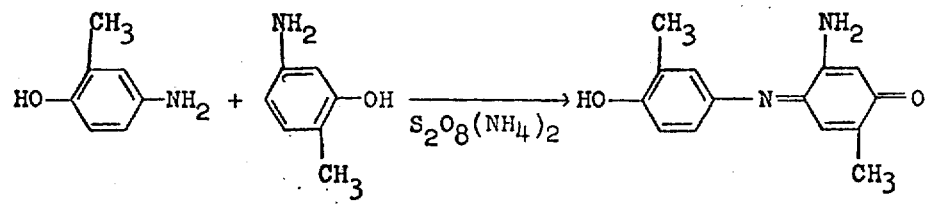

0.01 mole (1.23 g) of 3-amino-6-methyl phenol is dissolved in 75 cm³ of water. To this solution there is simultaneously added dropwise and with agitation (1) a solution of 0.01 mole (1.23 g) of 2-methyl-4-amino phenol in 20 cm³ of 0.5 N NaOH and (2) a solution of 0.01 mole (2.28 g) of ammonium persulfate in 50 cm³ of water to which had been added 15 cm³ of ammonia at 22° Be. The resulting reaction mixture is cooled to 0° and the pH thereof is lowered to 10.5 by the addition thereto of acetic acid. The above-identified indophenol precipitates in the form of a red product with metallic glints. The products is filtered off, washed with water and then dried under vacuum. It is chromatographically pure and melts between 124° and 126°.

Molecular mass calculated for $C_{14}H_{14}N_2O_2$: 242

Molecular mass found by potentiometric dosage in methylisobutylketone by perchloric acid: 248

| Analysis | Calculated for $C_{14}H_{14}N_2O_2$ | Found | |
|---|---|---|---|
| C % | 69.42 | 69.36 | 68.98 |
| H % | 5.78 | 5.79 | 5.68 |
| N % | 11.57 | 11.52 | 11.35 |

EXAMPLE 8

N-[(3',5'-dimethyl-4'-hydroxy)phenyl]-3-acetylamino-6-methyl benzoquinone-imine is prepared in accordance with the following reaction:

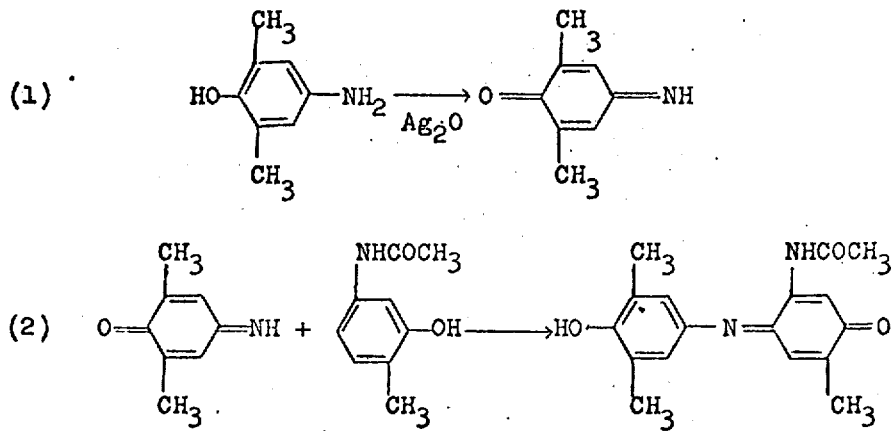

In the first stage of this reaction, 2,6-dimethyl benzoquinone-imine is prepared by dissolving 0.02 mole (2.74 g) of 2,6-dimethyl-4-amino phenol in 250 cm³ of anhydrous ethyl ether, and to this resulting solution there is added 0.03 mole (6.90 g) of silver oxide and 20 g of anhydrous sodium sulfate. The mixture is stirred for 4 hours at 35° and at atmospheric pressure. After cooling, sodium sulfate and silver are removed by filtration and the filtrate is evaporated to dryness under vacuum. The resulting dry residue, after recrystallization in cyclohexane, yields 2 g of 2,6-dimethyl benzoquinone-imine which melts at 65°.

| Analysis | Calculated for $C_8H_9NO$ | Found | |
|---|---|---|---|
| N % | 10.37 | 10.26 | 10.29 |

In the second stage of this reaction N-[(3',5'-dimethyl-4'-hydroxy)phenyl]-3-acetylamino-6-methyl benzoquinone-imine is prepared by dissolving 0.01 mole (1.65 g) of 2-methyl-5-acetylamino phenol in 200 cm³ of water to which have been added 20 cm³ of ammonia. To this resulting solution there is added 0.01 mole (1.35 g) of the 2,6-dimethyl benzoquinone-imine prepared in the first stage and dissolved in 100 cm³ of water. The reaction is instantaneous and, after acidification of the reaction mixture to a pH of 5 by the addition thereto of a hydrochloric acid solution, 2.8 g of practically pure N-[(3',5'-dimethyl-4'-hydroxy)phenyl]-3-acetylamino-6-methyl benzoquinone-imine is recovered by filtration. The thus produced indophenol melts at 260°.

Molecular mass calculated for $C_{17}H_{18}N_2O_3$: 298

Molecular mass found by potentiometric dosing in acetic acid by perchloric acid: 310.

EXAMPLE 9

A hair dye composition made in acccordance with the present invention is prepared as follows:

| | |
|---|---|
| Compound of Example 3 | 0.1 g |
| Butylglycol | 5 g |
| Lauryl alcohol oxyethylenated with 10.5 moles of ethylene oxide | 5 g |
| Water q.s.p. | 100 cm³ |

This hair dye composition is applied to white hair for a period of about 20 minutes and imparts thereto, after rinsing and shampooing, an apricot coloring.

EXAMPLE 10

Another hair dye composition, according to this invention, is prepared as follows:

| | |
|---|---|
| Compound of Example 4 | 0.2 g |
| Ammonia at 22°Be, q.s.p. | pH 10 |
| Water, q.s.p. | 100 cm³ |

This hair dye composition is applied to white hair for a period of about 20 minutes and imparts thereto, after rinsing and shampooing, a salmon pink coloring.

EXAMPLE 11

A hair dye composition also in accordance with the present invention is prepared as follows:

| | |
|---|---|
| Compound of Example 1 | 0.1 g |
| Butylglycol | 5 g |
| Lauryl alcohol oxyethylenated with 10.5 moles of ethylene oxide | 5 g |
| Water, q.s.p. | 100 cm³ |

This hair dye composition is applied to gray hair for a period of about 30 minutes and imparts thereto, after rinsing and shampooing, a copper coloring.

EXAMPLE 12

Another hair dye composition prepared in accordance with the present invention is formulated as follows:

| | |
|---|---|
| Compound of Example 4 | 0.05 g |
| N-[(4'-amino)phenyl]-3-acetylamino-6-methylbenzoquinone-imine | 0.05 g |
| Ammonia at 22° Be, q.s.p. | pH 10 |
| Water, q.s.p. | 100 cm³ |

This hair dye composition is applied to white hair for a period of about 30 minutes and imparts thereto, after rinsing and shampooing, a rosewood coloring.

EXAMPLE 13

A hair dye composition made in accordance with the present invention is prepared as follows:

| | |
|---|---|
| Compound of Example 3 | 0.05 g |
| N-[4'-amino-3',5'-dimethyl-2'-methoxy)-phenyl]-2,6-dimethyl benzoquinone-imine | 0.05 g |
| Ammonia at 22° Be, q.s.p. | pH 10 |
| Water, q.s.p. | 100 cm³ |

This hair dye composition is applied to white hair for a period of about 30 minutes and imparts thereto, after rinsing and shampooing, a silver grey coloring with glints of blue.

EXAMPLE 14

Still another hair dye composition of this invention is prepared by admixing the following materials:

| | |
|---|---|
| Compound of Example 4 | 0.05 g |
| N-(4'-amino-3'-methyl)phenyl]-2-acetylaminobenzoquinone-imine | 0.05 g |
| Ammonia at 22°Be, q.s.p. | pH 10 |
| Water, q.s.p. | 100 cm³ |

This hair dye composition is applied to white hair for a period of about 30 minutes, and imparts thereto, after rinsing and shampooing, a gray pink coloring.

EXAMPLE 15

Yet another hair dye composition prepared in accordance with the present invention is formulated as follows:

| | |
|---|---|
| Compound of Example 4 | 0.1 g |
| Crotonic acid-vinyl acetate copolymer | 2 g |
| Ethanol at 96° titer, q.s.p. | 50 g |
| Water, q.s.p. | 100 cm³ |

This hair dye composition is applied as a hair-setting lotion to 100% white hair and imparts thereto a pink glint.

EXAMPLE 16

A hair dye composition prepared in accordance with this invention is formulated as follows:

| | |
|---|---|
| Compound of Example 6 | 0.2 g |
| Ammonia at 22°Be, q.s.p. | pH 10 |
| Water q.s.p. | 100 cm³ |

This hair dye composition is applied to 90% white hair for a period of about 20 minutes and imparts thereto, after rinsing and shampooing, a beige pink color.

EXAMPLE 17

Yet another hair dye composition prepared in accordance with the present invention consists of:

| | |
|---|---|
| Compound of Example 7 | 0.2 g |
| Ammonia at 22°Be, q.s.p. | pH 10 |
| Water, q.s.p. | 100 cm³ |

This hair dye composition is applied to 90% white hair for a period of about 20 minutes and imparts thereto, after rinsing and shampooing, a golden sand color.

EXAMPLE 18

Preparation of N-[(4'-hydroxy)phenyl]-3-acetylamino benzoquinone imine, having the formula:

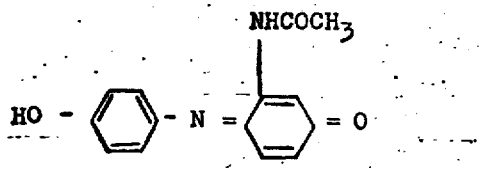

0.01 mole (1.51 g) of m-acetylamino phenol and 0.01 mole (1.09 g) of p-aminophenol are dissolved in 250 cc of water to which has been added 1.1 g of sodium carbonate. Oxygen is bubbled into this mixture for one hour and then $CO_2$ is bubbled into the solution until the pH thereof is about 8. The above indophenol is recovered by filtering and after washing the same with water, drying under vacuum and recrystallizing in a mixture of chloroform and petroleum ether, the resulting indophenol exhibits a melting point of 235°C.

| Analysis | Calculated for $C_{14}H_{12}N_2O_3$ | Found | |
|---|---|---|---|
| C% | 65.62 | 65.30 | 65.62 |
| H% | 4.68 | 4.70 | 4.74 |
| N% | 10.94 | 10.61 | 10.58 |

EXAMPLE 19

Preparation of N-[(4'-hydroxy)phenyl]-2,6-dimethyl-3-acetylamino benzoquinone imine

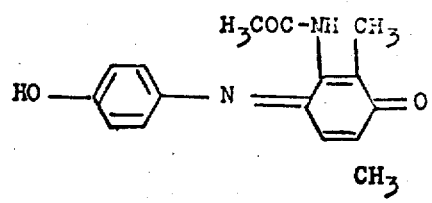

0.05 mole (5.45 g) of p-aminophenol and 0.05 mole (9 g) of 2,6-dimethyl-acetylamino phenol are dissolved in 100 cc of water, 50 cc of acetone and 25 cc of ammonia (22° Be). To this resulting solution, cooled in an ice bath, there is added, little by little, with agitation, 0.05 mole of ammonium persulfate in 25 cc of water. The reaction mixture is left to stand for 20 minutes at ambient temperature. Then, 6.7 g of the above indophenol are recovered by filtering. The indophenol after recrystallization from a mixture of acetone and water exhibits a melting point of 202°C.

Molecular weight calculated for $C_{16}H_{16}N_2O_3$: 284

Molecular weight found by potentiometric dosing in acetic acid by perchloric acid: 288.

| Analysis | Calculated for $C_{16}H_{16}N_2O_3$ | Found | |
|---|---|---|---|
| C % | 67.60 | 66.92 | 67.20 |
| H % | 5.63 | 5.74 | 5.57 |
| N % | 9.85 | 9.75 | 9.72 |

EXAMPLE 20

Preparation of N-[(4'-hydroxy-3',5'-dimethyl)phenyl]-3-acetylamino benzoquinone imine having the formula

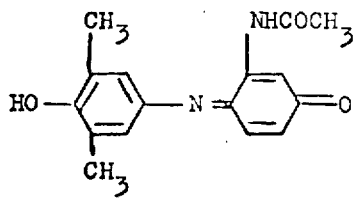

0.05 mole (9.5 g) of the monohydrate of 2,6-dimethyl-p-aminophenol·HCl is dissolved in 250 cc of water. Separately, 0.05 mole (7.5 g) of m-acetylamino phenol is dissolved in 50 cc of water to which has been added 30 cc of ammonia (22° Be). To this latter solution there is added 60 cc of the first solution and the mixture is cooled in an ice bath. There is then added, little by little, with agitation, simultaneously with the aid of a double funnel, the remainder of the first solution through one of said funnels and 0.1 mole (33 g) of potassium ferricyanide in 150 cc of water through the other funnel. After the addition of these materials is completed the reaction mixture is left to stand for 2 hours at 0°C. There is then added sufficient acetic acid to adjust the pH of the reaction mixture to about 8. 7.1 g of the above indophenol are recovered by filtering and after washing the same with water and drying under vacuum, the indophenol is found to contain, as an impurity, a small amount of N-[(4'-hydroxy-3',5'-dimethyl)phenyl]-2,6-dimethyl benzoquinone imine which results from the condensation of 2,6-dimethyl p-aminophenol on itself. This impurity, however, is eliminated by washing the product with ether and the thus washed indophenol is chromatographically pure and exhibits a melting point of 245°C.

| Analysis | Calculated for $C_{16}H_{16}N_2O_3$ | Found | |
|---|---|---|---|
| C % | 67.60 | 67.22 | 67.50 |
| H % | 5.83 | 5.72 | 5.95 |
| N % | 9.86 | 9.68 | 9.63 |

EXAMPLE 21

Preparation of N-[(4'-hydroxy-3',5'-dimethyl)phenyl]-3-amino-6-methyl benzoquinone imine having the formula:

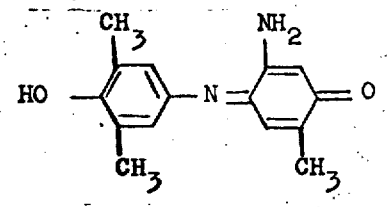

0.02 mole (2.46 g) of 2-methyl-5-amino phenol and 0.02 mole (3.83 g) of the monohydrate of 2,6-dimethylparaminophenol·HCl are dissolved in 200 cc of water to which has been added 80 cc of ammonia (22° Be). To this solution is added, little by little, with agitation, 0.02 mole (4.56 g) of ammonium persulfate in solution in 50 cc of water. The resulting reaction mixture is then left to stand for 15 minutes at ambient temperature. There is then added sufficient acetic acid to adjust the pH thereof to about 7.5. 3.20 g of the above indophenol are recovered by filtering. After washing with water and with acetone, the chromatographically pure indophenol exhibits a melting point of 262°C.

Molecular weight calculated for $C_{15}H_{16}N_2O_2$: 256

Molecular weight found by potentiometric dosing in acetic acid with perchloric acid: 257.

| Analysis | Calculated for $C_{15}H_{16}N_2O_2$ | Found | |
|---|---|---|---|
| C % | 70.40 | 69.92 | 70.03 |
| H % | 6.25 | 6.19 | 6.37 |
| N % | 10.93 | 10.68 | 10.66 |

EXAMPLE 22

A second process for the preparation of N-[4'-hydroxy-3',5'-dimethyl)phenyl]-3-amino-6-methyl benzoquinone imine.

0.01 mole (1.23 g) of 2-methyl-5-amino phenol is dissolved in 250 cc of a solution of 0.04 N NaOH to which has been added 40 cc of ammonia (22° Be). To this solution there is added, with agitation, 0.01 mole (1.69 g) of 2,6-dimethyl-N-chlorobenzoquinone imine in solution in 50 cc of ethyl alcohol. After completion of this addition, the agitation is continued for 30 minutes. The reaction mixture is then filtered and the filtrate acidified to a pH of 7.5 with acetic acid. There is then recovered by filtering 1.15 g of the above indophenol which, after recrystallization from a mixture of dimethyl formamide and water, exhibits a melting point of 262°C.

EXAMPLE 23

Preparation of N-[(4'-hydroxy-3',5'-dimethyl)phenyl]-3-amino-2,6-dimethyl benzoquinone imine having the formula:

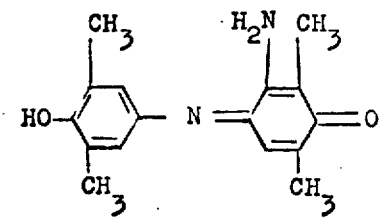

To a solution of 0.04 mole (5.48 g) of 2,6-dimethyl-3-amino phenol in 100 cc of water to which has been added 50 cc of ammonia (22° Be) there is simultaneously added, little by little, with agitation, with the aid of a double funnel, 0.04 mole (7.66 g) of the monohydrate of 2,6-dimethyl p-aminophenol·HCl in 100 cc of water through one funnel and 0.08 mole (26.3 g) of potassium ferricyanide in 100 cc of water through the other funnel. Thereafter, the above indophenol is recovered by filtering and washed with water followed by recrystallization from a mixture of dimethylformamide and water. The resulting indophenol exhibits a melting point of 243°C.

Molecular weight calculated for $C_{16}H_{18}N_2O_2$: 270

Molecular weight found by potentiometric dosing in methylisobutylketone by perchloric acid: 276.

| Analysis | Calculated for $C_{16}H_{18}N_2O_2$ | Found | |
|---|---|---|---|
| C % | 71.11 | 70.48 | 70.58 |
| H % | 6.66 | 6.56 | 6.54 |
| N % | 10.37 | 10.36 | 10.45 |

EXAMPLE 24

Preparation of N-[(4'-hydroxy-3',5'-dimethyl)phenyl]-2,6-dimethyl-3-acetylamino benzoquinone imine.

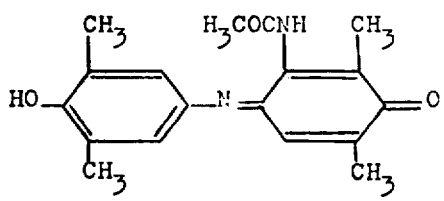

To a solution of 0.05 mole (9 g) of 2,6-dimethyl-3-acetylamino phenol in 100 cc of water and 25 cc of ammonia (22° Be) there are simultaneously added, little by little, with agitation and with the aid of a double funnel, 0.05 mole (9.5 g) of the monohydrate of 2,6-dimethyl p-aminophenol·HCl in 100 cc of water through one funnel and 0.05 mole (11.4 g) of ammonium persulfate in 25 cc of water through the other funnel, while maintaining the reaction mixture between 0° and 10°C. After completion of this addition the above indophenol is filtered off. After washing successively with water and with acetone, followed by drying under vacuum, the product (4.5 g) melts at 245°C.

Molecular weight calculated for $C_{18}H_{20}N_2O_3$: 312

Molecular weight found by potentiometric dosing in acetic acid with perchloric acid: 319.

| Analysis | Calculated for $C_{18}H_{20}N_2O_3$ | Found | |
|---|---|---|---|
| C % | 69.23 | 69.53 | 69.27 |
| H % | 6.41 | 6.38 | 6.52 |
| N % | 8.97 | 8.70 | 8.83 |

EXAMPLE 25

Preparation of N-[(4'-hydroxy-2'-chloro)phenyl]-3-amino-2,6-dimethyl benzoquinone imine, having the formula:

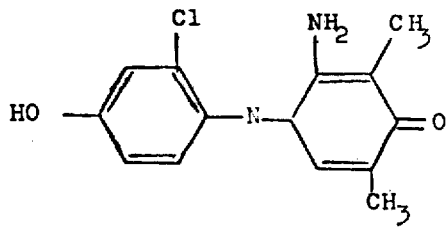

To a solution of 0.04 mole (5.48 g) of -2,6-dimethyl-3-amino phenol in 100 cc of water to which have been added 60 cc of ammonia (22° Be) there are added simultaneously, with agitation and with the aid of a double funnel, 0.04 mole (7.2 g) of the hydrochloride of 2-chloro-4-amino phenol in 200 cc of water through one funnel and 0.08 mole (26.32 g) of potassium ferricyanide in 100 cc of water through the other funnel. The above indophenol is recovered by filtering in a yield of 6 g and after washing with water and recrystallization in a mixture of dimethylformamide and water, the said indophenol exhibits a melting point of 287°C.

Molecular weight calculated for $C_{14}H_{13}N_2O_2Cl$ = 276.5

Molecular weight found by potentiometric dosing in methylisobutylketone by perchloric acid = 282.

| Analysis | Calculated for $C_{14}H_{13}N_2O_2Cl$ | Found | |
|---|---|---|---|
| C % | 60.75 | 60.87 | 60.57 |
| H % | 4.70 | 4.84 | 4.80 |
| N % | 10.12 | 9.94 | 10.14 |
| Cl % | 12.83 | 12.62 | 12.58 |

EXAMPLE 26

The following solution is prepared:

| | |
|---|---|
| Compound of Example 19 | 0.2 g |
| Ethyl alcohol 96°titer | 25 g |
| Water q.s.p. | 100 g |
| Ammonia (22° Be) q.s.p. | pH 10 |

This solution is applied on 100% white bleached hair and after 20 minutes at ambient temperature the hair is rinsed and shampooed. A pale golden blond coloration is imparted to the hair.

EXAMPLE 27

The following hair dye composition is prepared:

| | |
|---|---|
| Compound of Example 19 | 0.05 g |
| Copolymer of 10% crotonic acid — 90% vinyl acetate (M.W. 45,000–50,000) | 2 g |
| Ethyl alcohol — 96° titer, q.s.p. 50° titer | |
| Water q.s.p. | 100 g |
| Triethanolamine q.s.p. | pH 7 |

This solution is applied as a hair setting lotion to bleached hair and imparts thereto a pale salmon rose coloration.

EXAMPLE 28

The following hair dye composition is prepared:

| | |
|---|---|
| Compound of Example 20 | 0.15 g |
| Copolymer of crotonic acid-vinyl acetate (as in Example 27) | 2 g |
| Ethyl alcohol — 96° titer, q.s.p. 50° titer | |
| Water q.s.p. | 100 g |
| Triethanolamine q.s.p. | pH 7 |

This solution is applied as a hair setting lotion on bleached hair and imparts thereto a very luminous cyclamen coloration.

EXAMPLE 29

The following hair dye combination is prepared:

| | |
|---|---|
| Compound of Example 21 | 0.05 g |
| Copolymer of crotonic acid-vinyl acetate (as in Example 27) | 2 g |
| Ethyl alcohol — 96° titer q.s.p. 50° titer | |
| Water q.s.p. | 100 g |
| Triethanolamine q.s.p. | pH 7 |

This solution is applied as a hair setting lotion on bleached hair and imparts thereto a greyish beige color with mauve glints.

EXAMPLE 30

The following hair dye compositions is prepared:

| | |
|---|---|
| Compound of Example 21 | 0.2 g |
| Nitro orthophenylene diamine | 0.05 g |
| Copolymer of crotonic acid-vinyl acetate (as in Example 27) | 2 g |
| Ethyl alcohol — 96° titer q.s.p. 50° titer | |
| Water q.s.p. | 100 g |
| Triethanolamine q.s.p. | pH 7 |

This solution is applied as a hair setting lotion on bleached hair and imparts thereto a bright green bronze coloration.

EXAMPLE 31

The following hair dye composition is prepared:

| | |
|---|---|
| Compound of Example 23 | 0.1 g |
| Copolymer of crotonic acid-vinyl acetate (as in Example 27) | 2 g |
| Ethyl alcohol — 96° titer q.s.p. 50° titer | |
| Water q.s.p. | 100 g |
| Triethanolamine q.s.p. | pH 7 |

This solution is applied as a hair setting lotion on bleached hair and imparts thereto a very luminous apricot coloration.

EXAMPLE 32

A hair dye composition is prepared as follows:

| | |
|---|---|
| Compound of Example 24 | 0.1 g |
| N-[(4'-amino-3',5'-dimethyl-2'-methoxy)phenyl]-2,5-dimethyl benzoquinone imine | 0.1 g |
| Copolymer of crotonic acid-vinyl acetate (as in Example 27) | 2 g |
| Ethyl alcohol — 96° titer q.s.p. 50° titer | |
| Water q.s.p. | 100 g |
| Triethanolamine q.s.p. | pH 7 |

This solution is applied as a hair setting lotion on bleached hair and imparts thereto a wisteria coloration with silver glints.

EXAMPLE 33

The following hair dye solution is prepared:

| | |
|---|---|
| Compound of Example 18 | 0.05 g |
| Copolymer of crotonic acid-vinyl acetate (as in Example 27) | 2 g |
| Ethyl alcohol — 96° titer q.s.p. 50° titer | |
| Water q.s.p. | 100 g |
| Triethanolamine q.s.p. | pH 7 |

This solution is applied as a hair setting lotion on bleached hair and imparts thereto a very luminous salmon rose coloration.

EXAMPLE 34

The following hair dye composition is prepared:

| | |
|---|---|
| Compound of Example 23 | 0.25 g |
| Ethyl alcohol | 25 g |
| Water q.s.p. | 100 g |
| Ammonia (22° Be) q.s.p. | pH 10 |

This solution is applied as a hair setting lotion to 100% white bleached hair. After 20 minutes, at ambient temperature, the hair is rinsed and shampooed and there is imparted thereto a lightly rose golden blond coloration.

EXAMPLE 35

The following hair dye composition is prepared:

| | |
|---|---|
| Compound of Example 24 | 0.1 g |
| Copolymer of crotonic acid-vinyl acetate (as in Example 27) | 2 g |
| Ethyl alcohol, 96° titer q.s.p. 50° titer | |
| Water q.s.p. | 100 g |
| Triethanolamine q.s.p. | pH 7 |

This solution is applied as a hair setting lotion on bleached hair and imparts thereto a light purplish-blue rose coloration with silver glints.

EXAMPLE 36

The following hair dye composition is prepared:

| | |
|---|---|
| Compound of Example 25 | 0.15 g |
| Copolymer of crotonic acid-vinyl acetate (as in Example 27) | 2 g |
| Ethyl alcohol, 96° titer q.s.p. 50° titer | |
| Water q.s.p. | 100 g |
| Triethanolamine q.s.p. | pH 7 |

This solution is applied as a hair setting lotion on bleached hair and imparts thereto an apricot rose coloration.

EXAMPLE 37

Preparation of N-[(4'-hydroxy-3'-chloro) phenyl]-3-methylamino-6-methyl benzoquinone imine, having the formula

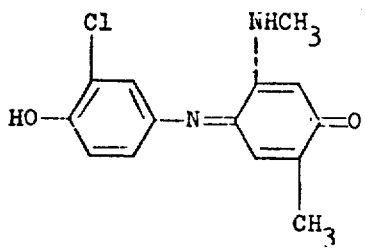

There is dissolved 0.01 mole (1.37 g) of 2-methyl-5-methylamine phenol in 15 cc of acetone to which are added 10 cc of ammonia (22° Be). Finally there is dissolved 0.01 mole (1.80 g) of 2-chloro-4-amino phenol monohydrochloride in 25 cc of water. The two resulting solution are mixed together and while maintaining the temperature of the resulting mixture at about 0°C, there is added thereto, little by little, 0.02 mole (4.6 g) of ammonium persulfate in solution in 15 cc of water. At the end of this addition step the reaction mixture is filtered to recover the above indophenol which is then washed with water, with agitation, the wash water containing sufficient acetic acid to impart to the same a pH of about 6. The indophenol is filtered from the wash medium, washed again with water and recrystallized in a mixture of water and acetone. After drying under a vacuum the resulting indophenol exhibits a melting point of about 226°C.

| Analysis | Calculated For $C_{14}H_{13}N_2ClO_2$ | Found | |
|---|---|---|---|
| C % | 60.76 | 59.98 | 60.20 |
| H % | 4.70 | 4.92 | 5.0 |
| N % | 10.12 | 10.05 | 10.00 |
| Cl % | 12.84 | 12.68 | 12.74 |

EXAMPLE 38

Preparation of N-[(4'-hydroxy-3'-chloro)phenyl]-2-chlor-5-amino benzoquinone imine, having the formula

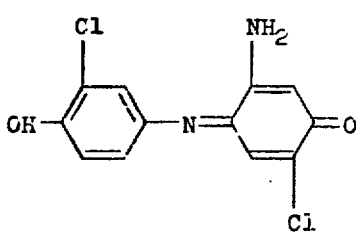

There is dissolved 0.01 mole (1.43 g) of 2-chloro-5-amino phenol in 15 cc of acetone to which are added 10 cc of ammonia (22°Be). There is then dissolved 0.01 mole (1.80 g) of 2-chloro-4-amino phenol monohydrochloride in 25 cc of water. The two solutions are then mixed together and while maintaining the temperature of the resulting mixture of about 0°C. there is added, little by little, 0.02 mol (4.6 g) of ammonium persulfate in 25 cc of waer. At the end of this addition step, the reaction mixture is filtered to recover the above indophenol which is washed first in a weakly acetic acid solution, then in a pure water medium and finally with a little acetone. After drying under a vacuum, the above indophenol exhibits a melting point of 252°C.

| Analysis | Calculated For $C_{12}H_9N_2Cl_2O_2$ | Found | |
|---|---|---|---|
| C % | 50.89 | 50.55 | 50.64 |
| H % | 2.82 | 3.05 | 3.19 |
| N % | 9.88 | 10.04 | 10.15 |
| Cl % | 25.09 | 24.83 | 24.95 |

EXAMPLE 39

Preparation of N-[(4'-hydroxy)phenyl]-2-methyl-5-carbamylmethylamino benzoquinone imine, having the formula

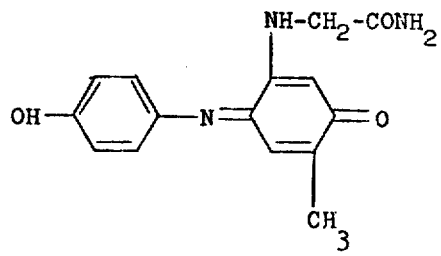

There are dissolved 0.01 mole (1.09 g) of paraaminophenol and 0.01 mole(1.80 g) of 2-methyl-5-carbamylmethylamino phenol in 25 cc of water, 50 cc of acetone and 50 cc of ammonia (22°Be). There is then added to this resulting solution, over a 15 minute period and with agitation, and while maintaining the same at a temperature between 0°–5°C, 0.02 mol (4.6 g) of ammonium persulfate in 90 cc of water. Agitation of the reaction mixture is then continued for an additional 2 hours, after which the reaction mixture is filtered to recover the above indophenol which is then washed with water. After recrystallization of the recovered indophenol from a mixture of dimethyl formamide and water, the resulting product exhibited a melting point of 270°C.

| Analysis | Calculated For $C_{15}H_{15}O_3N_3$ | Found | |
|---|---|---|---|
| C % | 63.15 | 63.06 | 63.24 |
| H % | 5.30 | 5.43 | 5.51 |
| N % | 14.73 | 14.64 | 14.78 |

EXAMPLE 40

Preparation of N-[(4'-hydroxy)phenyl]-3-ureido-6-methyl benzoquinone imine, having the formula

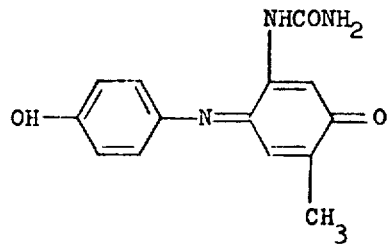

There is dissolved in 0.3 mol (49.8 g) of 2-methyl-5-ureido phenol in 1200 cc of isopropyl alcohol to which have been added 4 liters of ice water and 1200 cc of ammonia (22°Be). To this resulting solution, there is added 0.3 mole (32.7 g) of para aminophenol with agitation. There is then added, little by little, 0.6 mole (136.8 g) of ammonium persulfate in 450 cc of water.

At the end of this addition step, there is added to the reaction mixture sufficient acetic acid to impart thereto a pH of about 9. The above indophenol crystallizes out of the reaction mixture and is filtered therefrom. The thus recovered indophenol is washed with water and dried under a vacuum. The product is chromatographically pure and melts with decomposition at a temperature greater than 260°C.

| Analysis | Calculated For $C_{14}H_{13}N_3O_3$ | Found | |
|---|---|---|---|
| C % | 61.98 | 61.84 | 61.90 |
| H % | 4.83 | 5.05 | 5.02 |
| N % | 15.49 | 15.41 | 15.30 |

EXAMPLE 41

Preparation of N-[(4'-hydroxy)phenyl]-2,6-dimethyl-5-ureido benzoquinone imine, having the formula

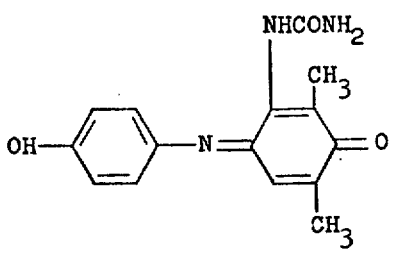

There is dissolved 0.25 mole (45.0 g) of 2,6-dimethyl-5-ureido phenol and 0.25 mole (27.2 g) of paraaminophenol in 1 liter of isopropyl alcohol to which have been added 900 cc of ammonia (22°Be) and 1500 cc of ice water. To this resulting solution there is added, little by little, with agitation, 0.5 mole (114 g) of ammonium persulfate in 500 cc of water, while cooling the reaction mixture so that the temperature thereof does not exceed +5°C. Agitation of the reaction mixture is continued for an additional 20 minutes at which there is added to the reaction mixture sufficient acetic acid to impart thereto a pH of 9. The above indophenol crystallizes out and is then filtered from the reaction mixture. The thus recovered indophenol is washed with water and dried under vacuum. It is chromatographically pure and melts with decomposition at 256°C.

| Analysis | Calculated For $C_{15}H_{15}N_3O_3$ | Found | |
|---|---|---|---|
| C % | 63.15 | 63.28 | 63.02 |
| H % | 5.30 | 5.43 | 5.53 |
| N % | 14.73 | 14.62 | 14.54 |

EXAMPLE 42

Preparation of N-[(4'-hydroxy-2'-chloro)phenyl]-2-methyl-5-ureido benzoquinone imine, having the formula

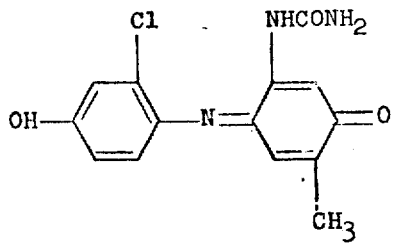

There is dissolved 0.2 mole (33.2 g) of 2-methyl-5-ureido phenol in one liter of isopropyl alcohol to which has been added 1 liter of ammonia (22°Be). There is then dissolved 0.22 mole (31.6 g) of 3-chloro-4-amino phenol in 600 cc of water to which have been added 30 cc of hydrochloric acid (d = 1.18). The two solutions are then mixed together and to the resulting solution there are added 1.6 kg of crushed ice. To this solution there is then added, little by little, and with good agitation, 0.44 mole (101 g) of ammonium persulfate in solution in 300 cc of water. At the end of this addition step the reaction mixture is filtered to recover the above indophenol in crude form. The thus recovered indophenol is washed, with good agitation, in a liter of water to which is added sufficient acetic acid to maintain the pH thereof at 6. The wash is filtered to recover the indophenol which is then washed with water and recrystallized from a mixture of dimethyl formamide and waater. After drying under a vacuum, the indophenol exhibits a melting point of 260°C.

| Analysis | Calculated For $C_{14}H_{12}O_3N_3Cl$ | Found | |
|---|---|---|---|
| C % | 55.00 | 55.27 | 55.30 |
| H % | 3.93 | 3.92 | 3.99 |
| N % | 13.74 | 13.56 | 13.62 |
| Cl % | 11.62 | 11.84 | 11.84 |

EXAMPLE 43

Preparation of N-[(4'-hydroxy-3'-chloro)phenyl]-3-ureido benzoquinone imine, having the formula

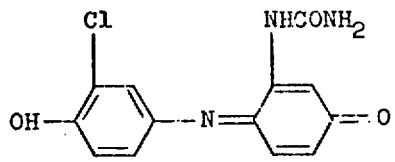

There is dissolved 0.2 mole (30.4 g) of 3-ureido phenol in one liter of isopropyl alcohol to which has been added 1 liter of ammonia (22°Be). There is then dissolved 0.22 mole (39.6 g) of 2-chloro-4-amino phenol monohydrochloride in 500 cc of water. The two solutions are then mixed together and to the resulting solution there is added, initially, 1,500 kg of crushed ice and then, with good agitation, 0.44 mole (101 g) of ammonium persulfate in 300 cc of waer. At the end of this addition step, there are then added to the reaction mixture 2 kg of crushed ice and then the reaction mixture is neutralized by adding thereto sufficient acetic acid. The reaction mixture is then filtered to recover the above indophenol which is then washed with water and recrystallized from pyridine. After drying under a vacuum, the product melts with decomposition above 270°C.

| Analysis | Calculated For $C_{13}H_{10}O_3N_3Cl$ | Found | |
|---|---|---|---|
| C % | 53.52 | 53.78 | 53.68 |
| H % | 3.43 | 3.45 | 3.62 |
| N % | 14.41 | 14.38 | 14.53 |

EXAMPLE 44

Preparation of N-[(4'-hydroxy-3'-chloro)phenyl]-2-methyl-5-ureido benzoquinone imine, having the formula

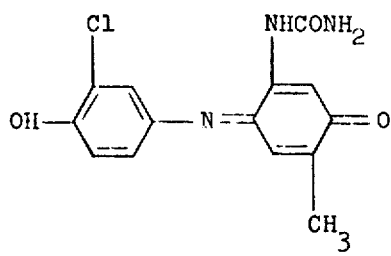

There is dissolved, on the one hand, 0.2 mole (33.2 g) of 2-methyl-5-ureido phenol in 1 liter of isopropyl alcohol to which has been added 1 liter of ammonia (22°Be), and on the other hand 0.22 mole (39.6 g) of 2-chloro-4-amino phenol monohydrochloride in 500 cc of water. The resulting two solutions are mixed together and to the mixture there are added 1.5 kg of crushed ice and then, little by little, with agitation, 0.44 mole (101 g) of ammonium persulfate in 300 cc of water. At the end of this addition step the reaction mixture is filtered to recover the crude indophenol which is then washed in water and recrystallized from a mixture of dimethyl formamide and water. After drying under a vacuum the product is chromatographically pure and melts with decomposition above 270°C.

| Analysis | Calculated For $C_{14}H_{12}O_3N_3Cl$ | Found | |
|---|---|---|---|
| C % | 55.00 | 55.06 | 54.97 |
| H % | 3.93 | 3.99 | 4.00 |
| N % | 13.74 | 13.93 | 13.90 |

EXAMPLE 45

Preparation of N-[(4'-hydroxy-3'-chloro)phenyl]-2,6-dimethyl-5-ureido benzoquinone imine, having the formula

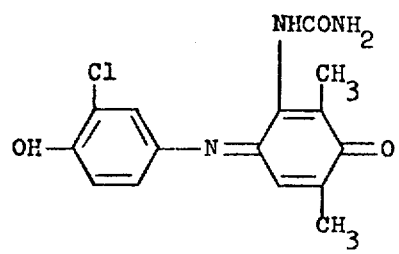

There is dissolved 0.2 mol (36 g) of 2,6-dimethyl-3-ureido phenol in one liter of isopropyl alcohol to which has been added one liter of ammonia (22°Be). There is then dissolved 0.22 mole (39.6 g) of 2-chloro-4-amino phenol monohydrochloride in 500 cc of water. The two solutions are then mixed together and to the resulting mixture there are added, initially, 1.5 kg of crushed ice and then, little by little, with good agitation, 0.44 mole (101 g) of ammonium persulfate in solution in 300 cc of water. At the end of this addition step, the above indophenol is precipitated by neutralizing the reaction medium with acetic acid. The crude indophenol is recovered therefrom by filtering the reaction medium and is then washed with water, recrystallized from a mixture of pyridine and water and dried under a vacuum. It exhibits a melting point of 199°C.

| Analysis | Calculated For $C_{15}H_{14}O_3N_3Cl$ | Found | |
|---|---|---|---|
| C % | 56.34 | 56.15 | 55.92 |
| H % | 4.36 | 4.51 | 4.47 |
| N % | 13.16 | 13.21 | 13.06 |
| Cl % | 11.11 | 11.31 | |

EXAMPLE 46

Preparation of N-[(4'-hydroxy-2'-chloro)phenyl] 2,5-diacetylamine benzoquinone imine, having the formula

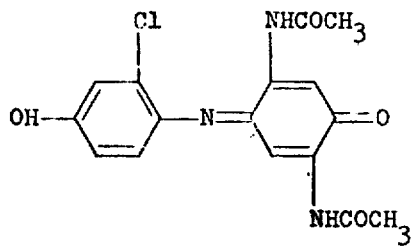

There is dissolved 0.01 mole (2.08 g) of 2,5-diacetylamine phenol in 15 cc of acetone to which have been added 10 cc of ammonia (22°Be). There is then dissolved 0.01 mole (1.80 g) of 3-chloro-4-amino phenol monohydrochloride in 15 cc of water to which have been added 10 cc of acetate. The two solutions are mixed together and while maintaining the temperature at about 0°C, there is added thereto, with agitation, 0.02 mole (4.6 g) of ammonium persulfate in 25 cc of water. At the end of this addition step, the reaction mixture is filtered to recover the above indophenol. The thus recovered indophenol is washed, with good agitation, in water to which is added during the washing operation, sufficient acetic acid to maintain the pH of the wash medium at 6. Thereafter the wash medium is filtered to recover the indophenol which is then washed with water and recrystallized from a mixture of dimethyl formamide and water. The product is then dried under a vacuum and is found to melt with decomposition above 270°C.

| Analysis | Calculated For $C_{16}H_{14}N_3ClO_4$ | Found | |
|---|---|---|---|
| C % | 55.24 | 54.97 | 54.83 |
| H % | 4.02 | 4.12 | 4.24 |
| N % | 12.08 | 11.98 | 12.06 |
| Cl % | 10.21 | 10.16 | 9.98 |

EXAMPLE 47

Preparation of N-[(4'-hydroxy-2'-chloro)phenyl]3-ureido benzoquinone imine, having the formula

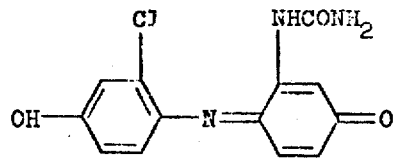

There is dissolved 0.2 mole (30.4 g) of 3-ureido phenol in one liter of isopropyl alcohol and one liter of ammonia (22°Be). There is then dissolved 0.22 mole (31.6 g) of 3-chloro-4-amino phenol in 600 cc of water and 30 cc of hydrochloric acid ($d = 1.18$). The two solutions are then mixed together and to the resulting mixture there are added 1.5 kg of crushed ice. There is then added to this mixture, little by little, with agitation, 0.44 mole (101 g) of ammonium persulfate in 300 cc of water. The above crude indophenol precipitates and is filtered from the reaction mixture. The thus recovered indophenol is then treated, with agitation, in 500 cc of water to which is added sufficient acetic acid to maintain the pH thereof at 6. This wash medium is filtered to recover the indophenol which is then washed with water and recrystallized from a mixture of dimethyl formamide and water. After drying under a vacuum, the product melts with decomposition at 270°C.

| Analysis | Calculated For $C_{13}H_{10}O_3N_3Cl$ | Found | |
|---|---|---|---|
| C % | 53.52 | 53.52 | 53.45 |
| H % | 3.43 | 3.47 | 3.59 |
| N % | 14.41 | 14.25 | 14.48 |
| Cl % | 12.17 | 12.32 | 12.32 |

EXAMPLE 48

The following hair dye solution is prepared:

| | |
|---|---|
| Compound of Example 42 | 0.1 g |
| N-[(4'-amino-3'-chloro)phenyl]-3-amino-6-methyl benzoquinone imine | 0.05 g |
| N-[(2'-methoxy-4'-amino-5'-methyl)-phenyl]-2,6-dimethyl benzoquinone imine | 0.005 g |
| Copolymer of 70% polyvinyl pyrrolidone — 30% vinyl acetate, M.W. 40,000, sold under the tradename PVP/VAE735 | 3 g |
| Ethyl alcohol (96°) | 20 g |
| Triethanolamine, q.s.p. | pH 8.5 |
| Water, q.s.p. | 100 g |

This solution is applied as a hair setting lotion on bleached hair and imparts thereto an antique rose coloration.

EXAMPLE 49

The following hair dye solution is prepared:

| | |
|---|---|
| Compound of Example 41 | 0.01 g |
| N-[(4'-amino-2',5'-dimethoxy)phenyl]-2-methyl-5-acetylamino benzoquinone imine | 0.01 g |
| N-[(4'-amino-3'-methyl)phenyl]-3-acetylamino-2,6-dimethyl benzoquinone imine | 0.01 g |
| Polyvinylpyrrolidone, M.W. 40,000 sold under the tradename DVP K 30 | 2 g |
| Ethyl alcohol (96°) | 40 g |
| Triethanolamine, q.s.p. | pH 6 |
| Water, q.s.p. | 100 g |

This solution is applied as a hair setting lotion on bleached hair and imparts thereto a pearly blue green coloration.

EXAMPLE 50

The following hair dye solution is prepared:

| | |
|---|---|
| Compound of Example 45 | 0.03 g |
| N-[(4'-amino-3'-methyl)phenyl]-3-amino-2,6-dimethyl benzoquinone imine | 0.01 g |
| N-[(4'-amino-2',5'-dimethyoxy)phenyl]-5-acetylamino-2-methyl benzoquinone imine | 0.01 g |
| Copolymer of polyvinylpyrrolidone/vinyl acetate (60/40) M.W. 60,000–120,000 | 3 g |
| Ethyl alcohol (96°) | 20 g |
| Triethanolamine, q.s.p. | pH 9 |
| Water, q.s.p. | 100 g |

This solution is applied as a hair setting lotion to bleached hair and imparts thereto a pearlescent rose coloration.

EXAMPLE 51

The following hair dye solution is prepared:

| | |
|---|---|
| Compound of Example 40 | 0.04 g |
| N-[(4'-amino-3'-methyl)phenyl]-3-acetylamino-2,6-dimethyl benzoquinone imine | 0.01 g |
| N-[(4'-amino-2'-methoxy-5'-methyl)phenyl]-3-acetylamino-2,6-dimethyl benzoquinone imine | 0.01 g |
| Terpolymer of methyl methacylate/stearyl methacrylate/dimethyl methacrylate (20/23/57) made in accordance with SN 287,875 filed 9/17/72 | 0.1 g |
| Ethyl alcohol (96°) | 50 g |
| Triethanolamine q.s.p. | pH 9 |
| Water, q.s.p. | 100 g |

This solution is applied as a hair setting lotion to bleached hair and imparts thereto a pearlescent beige rose coloration.

EXAMPLE 52

The following hair dye solution is prepared:

| | |
|---|---|
| Compound of Example 43 | 0.03 g |
| N-[(4'-amino-2'-methoxy)phenyl]-2,6-dimethyl benzoquinone imine | 0.01 g |
| N-[(4'-amino)phenyl]-5-acetylamino-2-methyl benzoquinone imine | 0.01 g |
| Terpolymer of vinyl acetate/allyl stearate/allyloxy acetic acid (80/15/5) made in accordance with SN 747,460 filed 7/25/68 | 1 g |
| Ethyl alcohol (96°) | 50 g |
| Triethanolamine, q.s.p. | pH 7 |
| Water, q.s.p. | 100 g |

This solution is applied as a hair setting lotion on white hair and imparts thereto a beige rose coloration.

EXAMPLE 53

The following hair dye solution is prepared:

| | |
|---|---|
| Compound of Example 39 | 0.01 g |
| N-[(4'-amino-3!-methyl)phenyl]-3-acetylamino-2,6-dimethylbenzoquinone imine | 0.01 g |
| N-[(4'-amino-3',5'-dimethyl-2'-methoxy)phenyl]-2,6-dimethyl benzoquinone imine | 0.01 g |
| Copolymer of polyvinylpyrrolidone/vinyl acetate (30/70) M.W. 160,000 | 3 g |
| Ethyl alcohol (96°) | 30 g |
| Triethanolamine.q.s.p. | pH 9.8 |
| Water, q.s.p. | 100 g |

This solution is applied as a hair setting lotion on white hair and imparts thereto a silvery light blue coloration.

EXAMPLE 54

The following hair dye solution is prepared:

| | |
|---|---|
| Compound of Example 47 | 0.005 g |
| Copolymer of vinyl acetate/crotonic acid (90/10) M.W. 45,000–50,000 | 1.35 g |

| | |
|---|---|
| Ethyl alcohol (96°) | 33.8 g |
| Triethanolamine, q.s.p. | pH 5 |
| Water, q.s.p. | 100 g |

This solution is applied as a hair setting lotion on bleached hair. After drying with warm air it imparts thereto a pearlescent blond coloration.

EXAMPLE 55

The following hair dye solution is prepared:

| | |
|---|---|
| Compound of Example 44 | 0.25 g |
| Copolymer of vinyl acetate/crotonic acid (90/10) M.W. 45,000–50,000 | 1.61 g |
| Ethyl alcohol (96°) | 40.3 g |
| Triethanolamine, q.s.p. | pH 8 |
| Water, q.s.p. | 100 g |

This solution is applied as a hair setting lotion on bleached hair. After drying with warm air it imparts thereto a rose blond coloration.

EXAMPLE 56

The following hair dye solution is prepared:

| | |
|---|---|
| Compound of Example 37 | 0.1 g |
| Polyvinylpyrrolidone, M.W. 40,000 | 2 g |
| Ethyl alcohol (96°) | 35 g |
| Triethanolamine, q.s.p. | pH 7.5 |
| Water, q.s.p. | 100 g |

This solution is applied as a hair setting lotion on bleached hair. After drying with warm air it imparts thereto a golden sand coloration.

EXAMPLE 57

The following hair dye solution is prepared:

| | |
|---|---|
| Compound of Example 38 | 0.05 g |
| Copolymer of polyvinylpyrrolidone/vinyl acetate (60/40) M.W. 60,000 120,000 | 1 g |
| Ethyl alcohol (96°) | 20 g |
| Triethanolamine, q.s.p. | pH 10.8 |
| Water, q.s.p. | 100 g |

This solution is applied as a hair setting lotion on bleached hair. After drying with warm air it imparts thereto a light lavender blue coloration.

EXAMPLE 58

The following hair dye solution is prepared:

| | |
|---|---|
| Compound of Example 46 | 0.2 g |
| Copolymer of vinyl acetate/crotonic acid (90/10) M. W. 45,000–50,000 | 3 g |
| Ethyl alcohol (96°) | 50 g |
| Triethanolamine, q.s.p. | pH 6 |
| Water, q.s.p. | 100 g |

This solution is applied as a hair setting lotion on bleached hair. After drying with warm air it imparts thereto a pearlescent beige rose coloration.

EXAMPLE 59

The following hair dye solution is prepared:

| | |
|---|---|
| Compound of Example 45 | 0.15 g |
| N-[(4'-amino-3'-chloro)phenyl]-3-amino-6-methyl benzoquinone imine | 0.05 g |
| N-[(4'-amino-3'-5'-dimethyl-2'-methoxy)phenyl]-2,6-dimethyl benzoquinone imine | 0.05 g |
| Butylglycol | 5 g |
| Lauryl alcohol oxyethylenated with 10.5 mols of ethylene oxide | 5 g |
| Triethanolamine, q.s.p. | pH 9 |
| Water, q.s.p. | 100 g |

This hair dye solution is applied to white hair for 30 minutes at ambient temperature. The hair is then rinsed, shampooed, rinsed again and dried. A pearlescent blond coloration with mauve glints is imparted to the hair.

EXAMPLE 60

The following hair dye solution is prepared:

| | |
|---|---|
| Compound of Example 40 | 0.2 g |
| N-[(4'-amino-3'-methyl)phenyl]-2-acetylamino benzoquinone imine | 0.05 g |
| N-[(4'-amino)phenyl]-5-acetylamino-2-methyl benzoquinone imine | 0.05 g |
| Butylglycol | 5 g |
| Lauryl alcohol oxyethylenated with 10.5 mols of ethylene oxide | 5 g |
| Triethanolamine, q.s.p. | pH 9 |
| Water, q.s.p. | 100 g |

This hair dye solution is applied to white hair for 30 minutes at ambient temperature. The hair is then rinsed, shampooed, rinsed again and dried. A light rose chestnut coloration is imparted to the hair.

EXAMPLE 61

The following hair dye solution is prepared:

| | |
|---|---|
| Compound of Example 37 | 0.2 g |
| N-[(4'-amino-2',5'-dimethyl)phenyl]-2-ureido benzoquinone imine | 0.1 g |
| N-[(4'-amino)phenyl]-2,6-dimethyl-3-ureido benzoquinone imine | 0.1 g |
| Ammonium lauryl sulfate | 20 g |
| Triethanolamine, q.s.p. | pH 9 |
| Water, q.s.p. | 100 g |

This hair dye solution is applied to white hair for 30 minutes at ambient temperature. The hair is then rinsed, shampooed, rinsed again and dried. A pearly gray coloration is imparted thereto. The above two indoanilines utilized in this hair dye solution are prepared in accordance with copending application Ser. No. 336,802, filed concurrently herewith, the description of the preparation of these indoanilines being incorporated herein by reference.

EXAMPLE 62

The following hair dye solution is prepared:

| | |
|---|---|
| Compound of Example 37 | 0.5 g |
| Ammonium lauryl sulfate | 20 g |
| Triethanolamine, q.s.p. | pH 9 |
| Water, q.s.p. | 100 g |

This hair dye solution is applied to white hair for 30 minutes at ambient temperature. The hair is then rinsed, shampooed, rinsed again and dried. A rose sand coloration is imparted thereto.

EXAMPLE 63

The following hair dye solution is prepared:

| | |
|---|---|
| Compound of Example 44 | 0.4 g |
| N-[(4'-amino)phenyl]-3-ureido benzoquinone imine | 0.1 g |
| Ammonium lauryl sulfate | 20 g |
| Triethanolamine, q.s.p. | pH 8.5 |
| Water, q.s.p. | 100 g |

This hair dye solution is applied to white hair for 30 minutes at ambient temperature. The hair is then rinsed, shampooed, rinsed again and dried. A silvery mauve coloration is imparted thereto. The above indoaniline utilized in this composition is also prepared in accordance with copending application Ser. No. 336,802, as above in Example 61, the preparation of which is also incorporated herein by reference.

What is claimed is:

1. A composition for coloring keratin fibers comprising a solution of an indophenol in a solvent selected from the group consisting of water and an aqueous solution of a lower alkanol, said indophenol having the formula

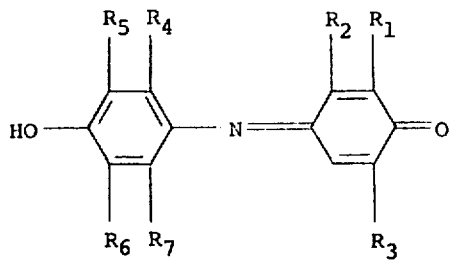

wherein
$R_1$ and $R_3$ each independently represent a member selected from the group consisting of hydrogen, halogen, lower alkyl and —NHCOR wherein R is lower alkyl;

$R_2$ represents a member selected from the group consisting of ureido, —NHCOR wherein R is lower alkyl and —NHR$_8$ represents a member selected from the group consisting of hydrogen, lower alkyl and carbamylmethyl, with the proviso that when $R_2$ is —NHR$_8$, $R_3$ is not hydrogen; and $R_4$, $R_5$, $R_6$ and $R_7$ each independently represent a member selected from the group consisting of hydrogen, halogen, lower alkyl and lower alkoxy, and said indophenol being present in said dye composition in amounts ranging between 0.01 to 0.5 weight percent of said composition.

2. The composition of claim 1 having a pH ranging between about 5 to about 11.

3. The composition of claim 2 having a pH ranging between 7-11.

4. The composition of claim 1 wherein the solvent is an aqueous solution of a lower alkanol and said composition also includes a film forming resin in amounts of about 1 to 3 weight percent based on the weight of said composition, said film forming resin being selected from the group consisting of polyvinylpyrrolidone having a molecular weight ranging from about 10,000 to 700,000; copolymer of vinylpyrrolidone and vinyl acetate wherein the ratio of VP to VA ranges between 30:70–70:30; terpolymer of 20% methyl methacrylate, 23% stearyl methacrylate and 57% dimethyl methacrylate; terpolymer of 80% vinyl acetate, 15% allyl stearate and 5% allyloxyacetic acid; and copolymer of 90% vinyl acetate and 10% crotonic acid having a molecular weight ranging from 45,000–50,000.

5. The composition of claim 4 wherein the lower alkanol is selected from the group consisting of ethanol and isopropanol.

6. The composition of claim 4, wherein said lower alkanol is present in amounts of about 20 to 50 weight percent of said composition.

7. A composition according to claim 1 which also contains an indoaniline.

8. A method for dyeing human hair which comprises impregnating the hair with a dye composition according to claim 1 in amounts effective to dye the hair, permitting said composition to remain in contact with said hair for a period of time ranging from about 5 to about 30 minutes, rinsing said hair with water and drying said hair.

9. A method for temporary dyeing and setting human hair which comprises impregnating wet hair with a composition according to claim 4 in amounts effective to dye and set said hair and rolling up and drying the hair.

* * * * *